(12) United States Patent
Veale et al.

(10) Patent No.: US 12,436,818 B2
(45) Date of Patent: Oct. 7, 2025

(54) DISABLING A PROCESSOR FACILITY ON A NEW PROCESSOR GENERATION WITHOUT BREAKING BINARY COMPATIBILITY

(71) Applicant: INTERNATIONAL BUSINESS MACHINES CORPORATION, Armonk, NY (US)

(72) Inventors: Brian Frank Veale, Cedar Park, TX (US); Arnold Flores, Round Rock, TX (US); Andre Laurent Albot, Austin, TX (US); Juan M. Casas, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 17/821,832

(22) Filed: Aug. 24, 2022

(65) Prior Publication Data
US 2024/0069980 A1 Feb. 29, 2024

(51) Int. Cl.
 *G06F 9/50* (2006.01)
(52) U.S. Cl.
 CPC .......... *G06F 9/5077* (2013.01); *G06F 9/5088* (2013.01)
(58) Field of Classification Search
 CPC ..... G06F 9/5077; G06F 9/5088; G06F 9/4856
 See application file for complete search history.

(56) References Cited

U.S. PATENT DOCUMENTS

| 9,858,058 B2 | 1/2018 | Gschwind |
| 10,637,724 B2 | 4/2020 | Johnson |

(Continued)

FOREIGN PATENT DOCUMENTS

| CN | 107864055 A | 3/2018 |

OTHER PUBLICATIONS

International Searching Authority, "Notification of Transmittal of the International Search Report and the Written Opinion of the International Searching Authority, or Declaration," Patent Cooperation Treaty, Oct. 19, 2023, 8 pages, International Application No. PCT/CN2023/111254.

(Continued)

*Primary Examiner* — Sisley N Kim
(74) *Attorney, Agent, or Firm* — Teddi Maranzano

(57) ABSTRACT

Method, computer program product, and computer system are provided. A first migration of a running logical partition (LPAR) is performed from a first-generation computer to a second-generation computer. Availability of a facility differs between the first- and second-generation computers. Upon completion of the first migration, an operating system of the running LPAR detects whether a required facility in use on the first-generation computer is available on the second-generation computer. Operating system takes an action to continue an orderly execution of the LPAR, the operating system, and threads of an application in the LPAR depending on the availability of the required facility. A second migration is performed of the running LPAR from the second-generation computer back to the first-generation computer. The required facility is available on the first-generation computer. The operating system restores access to threads of the application to the required facility.

20 Claims, 11 Drawing Sheets

(56) References Cited

U.S. PATENT DOCUMENTS

| | | | |
|---|---|---|---|
| 10,673,942 | B2 | 6/2020 | Illowsky |
| 11,042,422 | B1 | 6/2021 | Lebedynskiy |
| 2008/0172554 | A1 | 7/2008 | Armstrong |
| 2008/0235482 | A1 | 9/2008 | Armstrong |
| 2010/0287542 | A1 | 11/2010 | Neft |
| 2013/0268800 | A1 | 10/2013 | Rangaiah |
| 2017/0235612 | A1 | 8/2017 | Chen |
| 2020/0125384 | A1* | 4/2020 | Serebrin ............... G06F 9/4856 |
| 2020/0272491 | A1* | 8/2020 | Klein ................. G06F 9/45554 |

OTHER PUBLICATIONS

Veale, et al., "Disabling a Processor Facility on a New Processor Generation Without Breaking Binary Compatibility," Application and Drawings, Filed on Aug. 4, 2023, 38 Pages, Related PCT Patent Application Serial No. PCT/CN2023/111254.

Disclosed Anonymously, "Invalidate function at runtime to facilitate development," IP.com, Jan. 2, 2018, 7 pages, IP.com No. IPCOM000252254D, Retrieved from the Internet: <URL: https://priorart.ip.com/IPCOM/000252254>.

Disclosed Anonymously, "Method for verifying binary compatibility of code libraries with new functionality," IP.com, Mar. 29, 2010, 2 pages, IP.com No. IPCOM000194538D, Retrieved from the Internet: <URL: https://priorart.ip.com/IPCOM/000194538>.

Exojo, "Design and Implementation of a PTX Emulation Library," Polytechnic University of Catalonia, Jul. 2009, 77 pages, Retrieved from the Internet: <URL: https://www.researchgate.net/publication/277031121_Design_and_Implementation_of_a_PTX_Emulation_Library>.

Phillips, "An Efficient and Binary Compatible Means of Migrating an Unprotected, Single Mode Processor Architecture to a Protected, Dual Mode Processor Architecture," IP.com, Nov. 15, 2004, 5 pages, IP.com No. IPCOM000032849D, Retrieved from the Internet: <URL: https://priorart.ip.com/IPCOM/000032849>.

Rocha, "Moving from 32 to 64 bits while maintaining compatibility," Informatics Department, University of Minho, [accessed on Feb. 9, 2022], 7 pages.

Yiu, "Blending DSP and ML features into a low-power general-purpose processor—how far can we go?," [accessed on Feb. 9, 2022], 21 pages, Retrieved from the Internet: <URL: https://armkeil.blob.core.windows.net/developer/Files/pdf/white-paper/blending-dsp-and-ml-features-into-a-low-power-general-purpose-processor.pdf>.

* cited by examiner

DISABLING A PROCESSOR FACILITY ON A NEW PROCESSOR GENERATION WITHOUT BREAKING BINARY COMPATIBILITY

BACKGROUND

The present invention relates to computer systems, and more specifically to maintaining binary compatibility between hardware generations.

There are scenarios where two generations of computer server hardware have facilities that are mutually exclusive. In that case, applications written for one generation will not execute properly on the other generation without changes to the source code, or at least, a recompilation. In some cases, upgrading the operating system or other software in the application environment can be required, resulting in added licensing fees, and time to complete the migration.

It would be advantageous to enable migration between computer server hardware generations without incurring the associated software modifications, and yet maintaining binary compatibility between the two computer server hardware generations, such that the software execution produces the same correct results on each computer.

SUMMARY

A method is provided. A first migration of a running logical partition (LPAR) is performed from a first-generation computer to a second-generation computer. Availability of a facility differs between the first- and second-generation computers. Upon completion of the first migration, an operating system of the running LPAR detects whether a required facility in use on the first-generation computer is available on the second-generation computer. Operating system takes an action to continue an orderly execution of the LPAR, the operating system, and threads of an application in the LPAR depending on the availability of the required facility. A second migration is performed of the running LPAR from the second-generation computer back to the first-generation computer. The required facility is available on the first-generation computer. The operating system restores access to threads of the application to the required facility.

Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
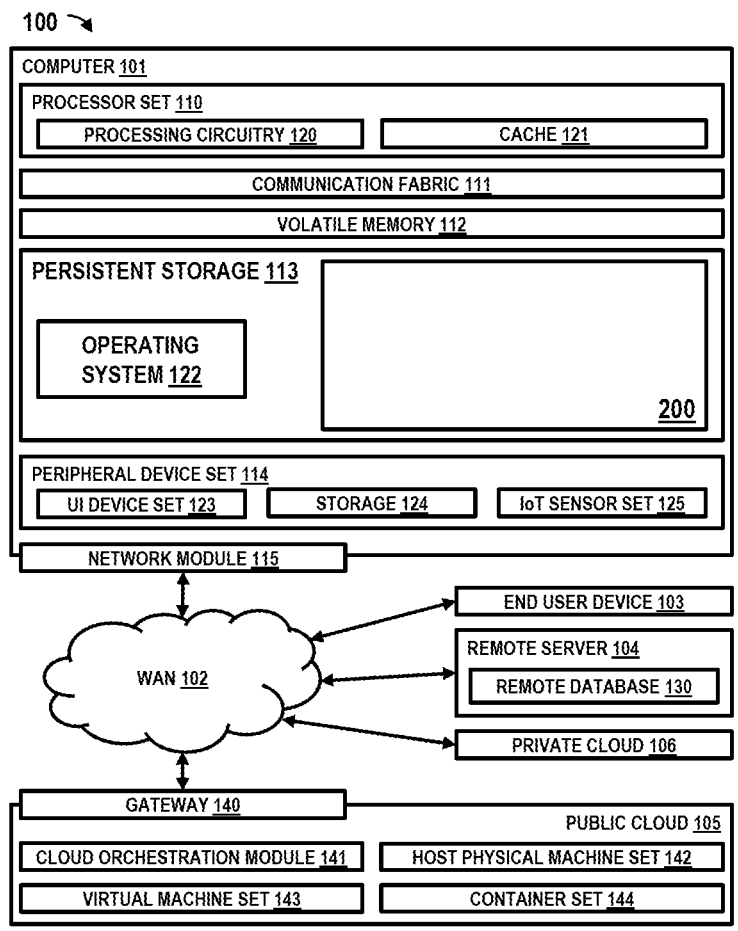
FIG. 1 illustrates the operating environment of a computer server, according to an embodiment of the present invention.

It can occur that two generations of computer server hardware have facilities that are mutually exclusive. In that case, applications written for one generation will not execute properly on the other generation without changes to the source code, or at least, a recompilation. In other words, the executable code is not binary compatible between the two generations.

Upgrading the operating system, or other software, in the application environment can be required in order to execute without error on the subsequent generation of computer server hardware. Additional licensing fees for new software versions can be required. However, embodiments of the present invention allow customers to execute on the new server version without having to update the operating system to a new version so long as the operating system is within a tolerance of currency, as defined by the server vendor.

Embodiments of the present invention are described in terms of IBM Power8®, IBM Power9™, and IBM Power10® hardware, Live Partition Mobility (LPM). IBM operating system software that uses transactional memory (TM) for atomicity, including AIX® and Linux are also presented. (IBM Power8®, IBM Power10® and AIX® are registered trademarks of IBM in the United States. IBM Power9™ is a trademark of IBM in the United States).

However, embodiments of the present invention are not limited to this environment and can be practiced in other hardware/software that provide LPM and TM.

For previous generations of Power servers, LPM was a popular option to migrate a running workload between server generations because the previous generations supported TM, and binary compatibility was assured. However, P10 no longer includes TM support, thereby eliminating this option.

Migration between P8/9 and P10 servers can still be performed without software modifications, but not without manual intervention. TM is disabled from the operating system (OS) on the P8/9 server that hosts the logical partition (LPAR), after which the system administrator reboots the LPAR. After the reboot, an alternative locking mechanism is activated. According to the architecture for TM on Power systems, the software is required to have an alternative locking mechanism. During live migration the hypervisor may optionally validate that the LPAR has never used TM and allow the live migration to occur without intervening. Not performing this check introduces the possibility that an administrator skips this step, resulting in an application using TM fails after the migration to the P10 system. Most LPARs booted with TM enabled will have used transactional memory in at least some of the software running in the LPAR before any LPM operation. For example, the Java® language and libraries are commonly included in software. (Java is a registered trademark of Oracle and/or its affiliates). Another issue with this approach is that once TM has been disabled (via an OS control), the LPAR cannot use TM again on P8/9 until a subsequent reboot with TM enabled. Furthermore, a subsequent live migration of the LPAR to a P10 system will require yet another reboot.

The following is a high-level summary of aspects of the present invention, as discussed in the following Figures. The various aspects of the present invention are implemented in the operating system, rather than including hypervisor level intervention in the implementation.

Transactions are failed for an LPAR that was migrated via LPM from a generation of computer that supports the TM facility (P8/9) to one that does not (P10), via a TM emulation mode that is implemented in the operation system. This emulation does not emulate the TM environment to allow the execution of TM instructions but enables orderly behavior of the application on the P10 environment to either terminate or to use another locking mechanism. The result is that the TM instructions are disabled when the operating environment (application, e.g.) is rebooted on the P10 server. Upon the boot of an LPAR on the P10, the system firmware reports to the operating system that TM is not supported, and the operating system reports this status to the application attempting to execute a TM instruction. Application Binary Interface (ABI) compliant applications can handle this by adhering to the requirement that the application use documented facilities provided by or through system software. For example, an application using TM must first issue a call to the OS to validate that the system it is running on supports TM. If an application attempts to start a transaction, the operating system sends an illegal operation exception to the process. This results in the process being terminated if the application does not handle the signal.

On LPM from P8/P9, the hypervisor makes TM available to the LPAR. The operating system forces any threads using TM that were suspended during the LPM freeze into the TM emulation mode. For threads with a transaction that was in transactional state before the LPM migration, after LPM the thread will be resumed at the software failure handler with a persistent failure cause. All software using TM instructions are required to include a transaction software failure handler that is executed when a transaction has failed. In the Power instruction set architecture, after a number of repeated failures, the software application must fall back to using a traditional locking path.

For threads with a transaction in suspended state at the time of the LPM event, the operating system puts the thread into an emulated suspend mode. This mode is implemented in the operating system and allows the transaction to complete the suspended section at which time the operating system fails it by resuming the transaction at the software failure handler with a persistent failure cause.

After LPM, when resuming any threads, the operating system makes TM unavailable to the thread via the Machine Status Register control bit for TM.

For running threads that were not in a transaction at the time of the LPM freeze, when the thread next attempts a transaction, the thread takes an unavailable interrupt, and the operating system immediately fails the transaction by resuming the thread at the software failure handler.

For new threads that attempt TM for the first time after LPM to the P10, the operating system reports that TM is not available. Applications attempting a transaction will be sent a termination signal (e.g., SIGILL) exception similar to the case when the LPAR was booted directly on a P10.

On LPM from P10 back to a P8/P9, the hypervisor makes TM available to the LPAR on the P8/P9 system. On the P8/P9 side, the operating system dynamically enables TM.

For running threads that were in a transaction that originated on the P8/9 and are in suspended mode prior to the LPM to P10, the operating system continues to support the emulated TM mode until the transaction goes back to transactional mode. At that point, the operating system fails the transaction. However, subsequent transactions are supported in normal P8/P9 TM mode.

Optionally, the operating system can resume the transaction in suspended mode by using a special checkpoint instruction when the thread is resumed on the P8/P9 system.

For new threads that attempt TM for the first time after LPM back to the P8/9, the operating system reports that TM is available. These threads are given access to TM along with the required process thread state.

The following examples describe migrating from a P8/9, where TM is supported, to the P10, where it is not, while maintaining binary compatibility of the workload and enabling the automated migration using LPM. Note that embodiments of the present invention can be extended to any processor facility that has an availability control similar to TM, and where software is required to provide a fail-over path when the associated instructions report a failure in the requested operation (or transaction in the case of TM). This includes floating point, and vector instructions that allow the OS to control whether software has access to the facility, and where software is required to provide a fail-over path when the associated instructions report a failure in the requested operation (or transaction in the case of TM).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending on the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Beginning now with FIG. 1, an illustration is presented of the operating environment of a networked computer, according to an embodiment of the present invention.

Computing environment 100 contains an example of an environment for the execution of at least some of the computer code involved in performing the inventive methods, such as disabling a processor facility without breaking binary compatibility 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, an administrator that operates computer 101), and may take any of the forms discussed above in connection with computer 101. For example, EUD 103 can be the external application by which an end user connects to the control node (200 of FIG. 2) through WAN 102. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
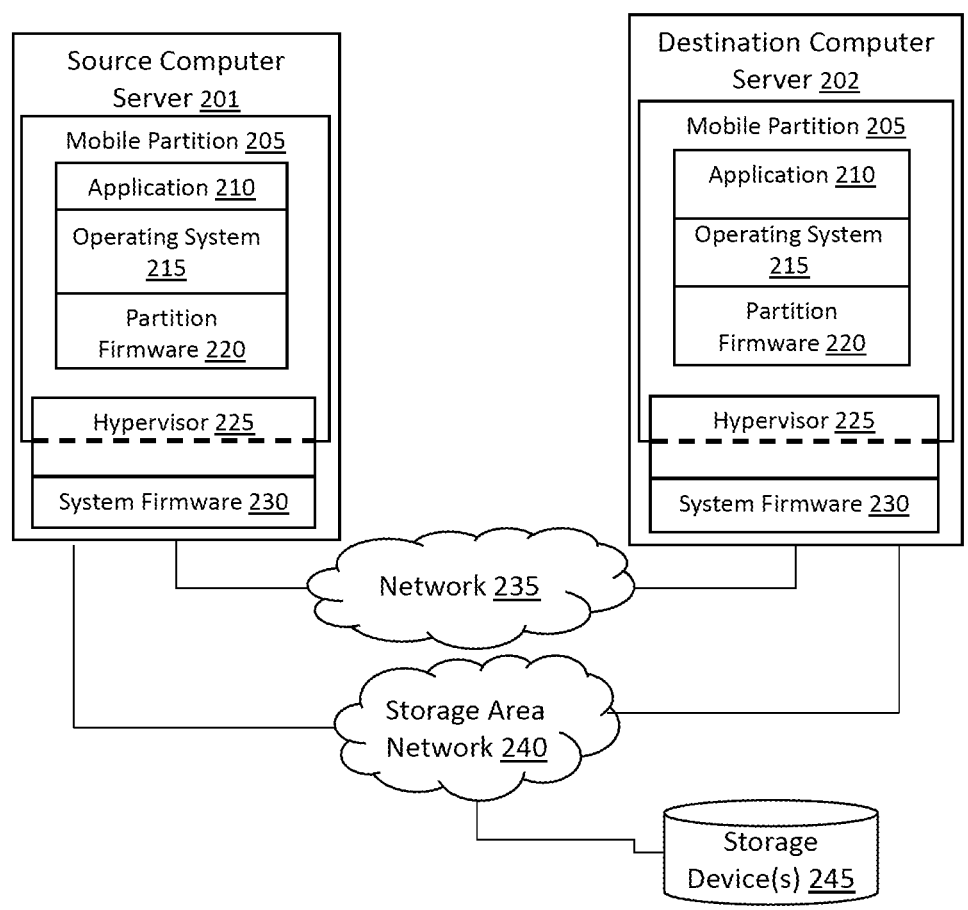
FIG. 2 illustrates an embodiment of the computer server of FIG. 1 as configured in a partition mobility environment, in accordance with one or more aspects of the present invention.

FIG. 2 illustrates an embodiment of the computer server of FIG. 1 as configured in a partition mobility environment, in accordance with one or more aspects of the present invention.

Source computer server (server) 201 depicts the source server environment. A portion of the server 201 hardware and certain software resources (hypervisor 225) are allocated to the LPAR (mobility partition 205). The hypervisor 225 coordinates with the operating system (OS) 215 and system firmware 230 to perform LPAR level functions, such as start/stop, reboot, and LPM of the workload running in the LPAR to another LPAR, here, mobile partition 205 on destination computer server (server) 202. System firmware 230 executes server-wide functions, including power on/off of the server 201 and monitoring health and availability of the server 201 hardware resources.

The network 235 connects the servers 201 and 202 and may be any network suitable for reliable high speed data transmission. The storage area network (SAN) 240 is a dedicated network, typically including storage systems (storage device(s) 245) networking switches and specialized software, configured for sharing data between servers (server 201 and 202).

Server 202 includes substantially the same elements as those in server 201. In particular, application 210 and operating system (OS) 215 are the same versions and maintenance levels as those shown in server 201 because the LPM practiced in embodiments of the present invention refers to moving the running unmodified workload from the server 201 to the server 202. Where the servers 201 and 202 are any combination of P8/9 servers, the running application 210 can migrate freely between them without modification. However, when the destination server is P10, LPM is not available without code modification or disabling TM through the operating system 215 on the server 201 first.

Figure 3:
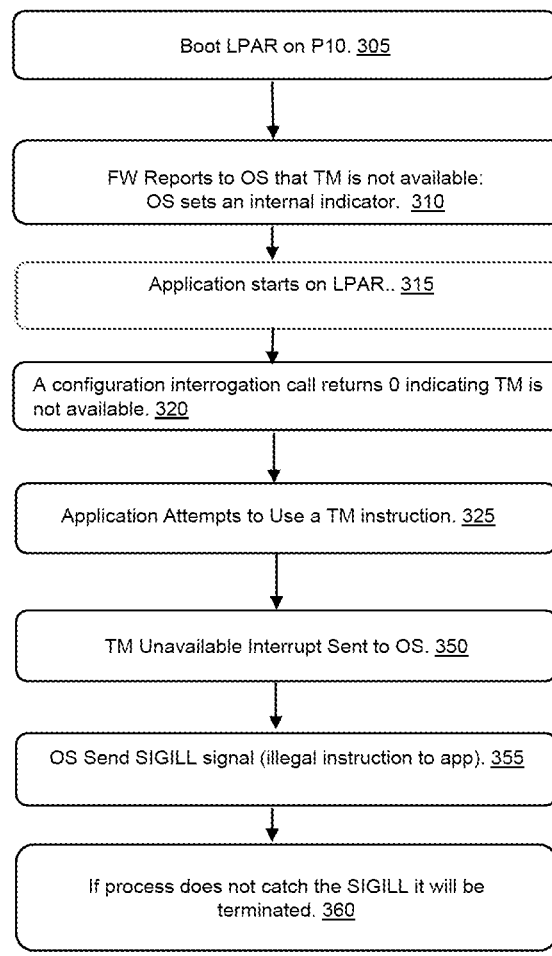
FIG. 3 illustrates a flow chart of booting a logical partition (LPAR) on a subsequent generation of computer server hardware.

FIG. 3 illustrates an exemplary flow chart of booting an LPAR on a subsequent generation (server 202) of computer server hardware where the application uses TM.

At 305, the LPAR receives a series of instructions from the hypervisor 225 and OS 215 to boot. The OS 215 also interrogates the system firmware 230 to learn which facilities are available on the server. At 310 the system firmware 230 notifies the OS 215 that the TM facility is not available. In response, the OS 215 sets an internal configuration indicator that TM is not available on that server. Alternatively in an embodiment, and without firmware 230 involvement, the OS 215 can recognize that the boot is occurring on a P10 server, and report that TM is not available. At 315, the application workload begins executing on the LPAR. At 320, a system configuration interrogation call returns a value, e.g., "0" indicating the TM facility is not available. At 325, the application 210 issues a TM instruction. However, application binary interface (ABI) compliant applications will not attempt to use TM when the configuration interrogation call indicates the TM facility is not available.

But at 350 a TM unavailable interrupt is returned to the OS 215. In response, at 355 the OS 215 sends a SIGILL signal to the application indicating that the TM instruction is an illegal instruction. If the process does not catch and handle the SIGILL, the process is terminated (360).

The following FIGS. 4-9 illustrate the process flow for TM disablement during LPM from a P8/9 server to a P10. Each of the Figures describes a condition of the transaction at the start of LPM and after LPM is completed.

Figure 10:
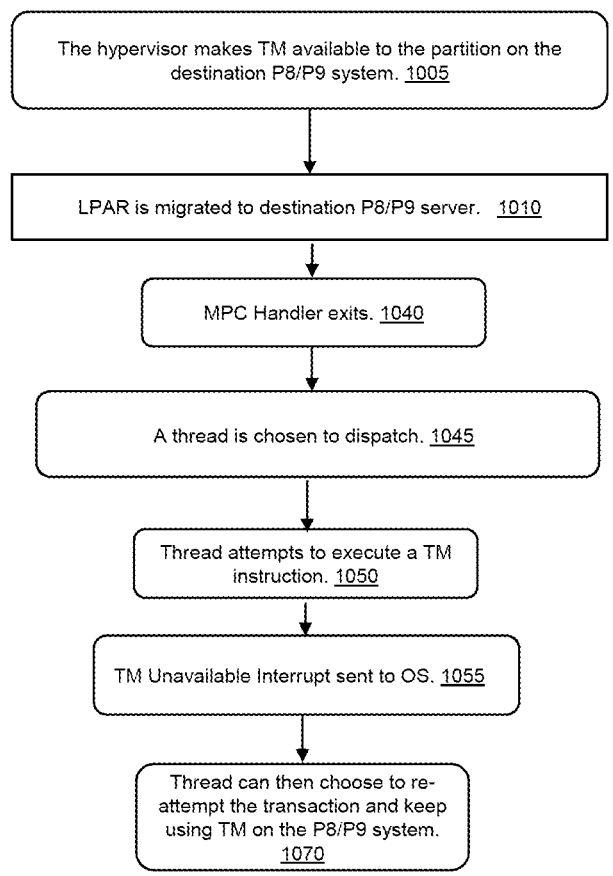
FIG. 10 illustrates a process flow for TM re-enablement on LPM from a subsequent generation of computer server hardware (P10) to that of a previous generation (P8/9), in accordance with one or more aspects of the present invention.
Figure 11:
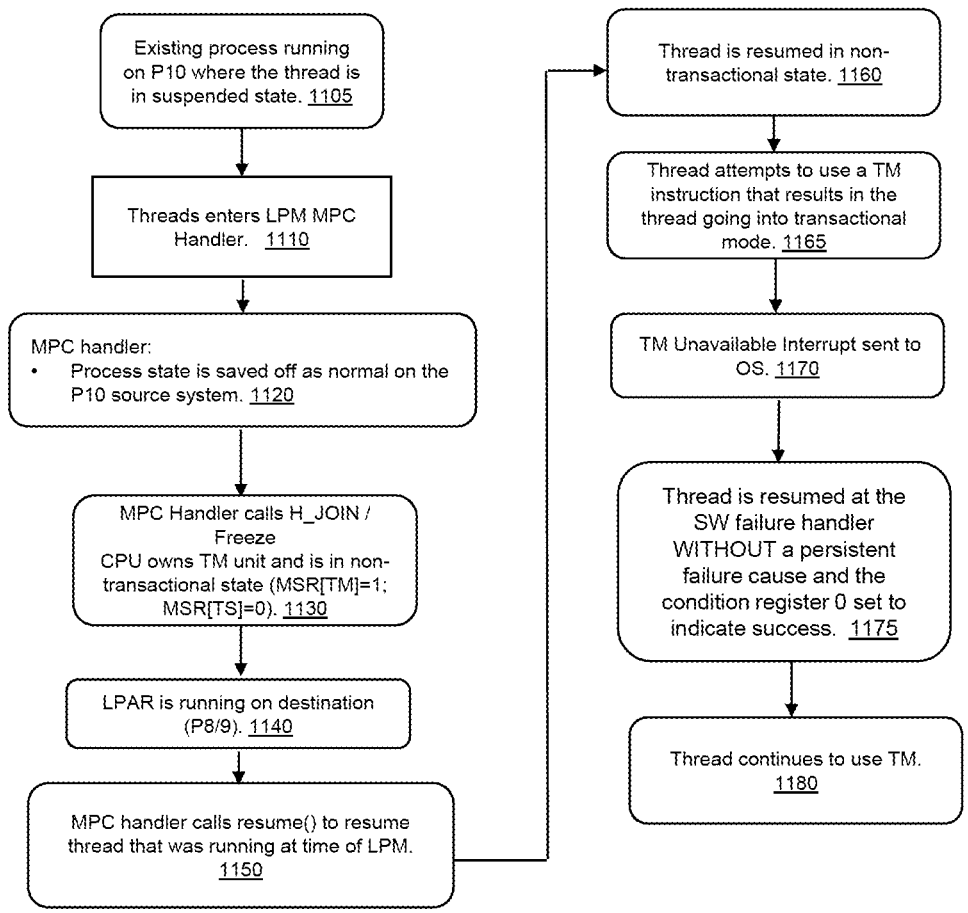
FIG. 11 illustrates another process flow for TM re-enablement on LPM from a subsequent generation of computer server hardware (P10) to that of a previous generation (P8/9), in accordance with one or more aspects of the present invention.

FIGS. 10-11 illustrate the process flow for TM re-enablement during LPM from the P10 server back to the P8/9. Each Figure describes a condition of the transaction at the start of LPM and after LPM is completed.

Figure 4:
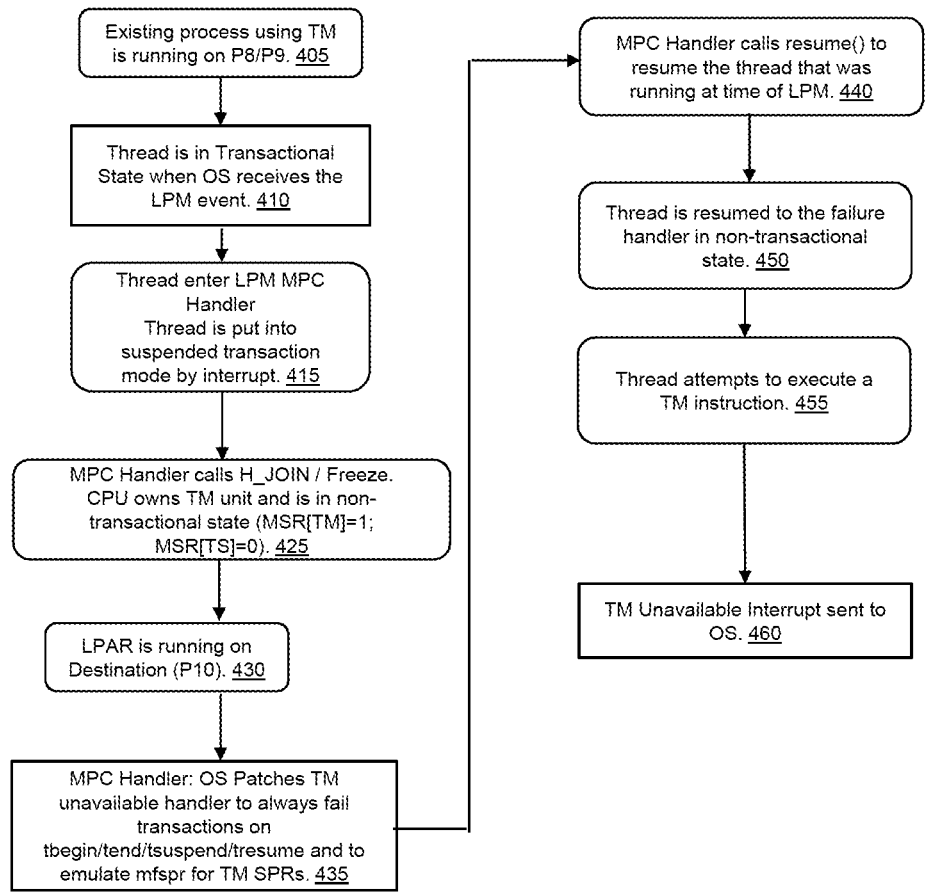
FIG. 4 illustrates a process flow for transactional memory disablement on live partition mobility (LPM) from a previous generation of computer server hardware (P8/9) to that of a subsequent generation (P10), in accordance with one or more aspects of the present invention.

FIG. 4 illustrates a process flow for TM disablement LPM from a P8/9 server to a P10, according to one or more aspects of the present invention.

In this example, the threads (processes) are in a transactional state at the time the LPM is initiated between the P8/9 and the P10. The transactional state is recognized when the thread (process) has issued the TBEGIN instruction, to denote the start point of the transaction, but has yet to execute the "TEND" instruction to denote the transaction end point.

At 405, the thread is executing on the P8/9 server where TM is enabled.

At 410, the thread is in transactional state at the time the OS 215 receives the command to enter the LPM event.

At 415, the thread enters the LPM MPC handler, and the thread is put into suspended transaction mode by an OS 215 interrupt. Storage accesses that the suspended thread performs are treated non-speculatively, i.e., writes are committed regardless of transaction success. The MPC handler reclaims the transaction into live registers and saves off the checkpoint state to the machine state area (MST). When a transaction is initiated or is failed, a set of registers are saved or restored which represent the pre-transaction state of the processor. The registers include the problem state writable registers, except for certain performance monitor, the TM SPRs, and condition registers.

Now, the thread is in non-transactional mode, and the thread no longer has TM access. Note, this is done on every LPM from a P8/P9 system regardless of whether the destination is a P10.

At 425, MPC handler freezes LPAR operations while the LPM migration is taking place.

At 430, the LPM completes, and the LPAR is running on the destination P10.

At 435, the MPC handler takes the following actions. The OS 215 patches the TM unavailable handler to always fail transactions on TM instructions (i.e., TBEGIN, TEND, TSUSPEND, and TRESUME) and to emulate the move from special registers (using for example the mfspr instruction) for the TM special purpose registers. These registers hold information related to the state of a TM transaction.

At 440, the MPC handler resumes (resume( )) the thread that was running at the time of the LPM. The resume( ) call restores the running state of the thread. The state of the general-purpose registers (GPRs) and special purpose registers (SPRs) are restored from the MST checkpoint state. The thread's TM state is set to restrict access to the TM unit in the machine status save/restore register. For example, upon return to thread context, a bit in the SSR1 is set to restrict access to the TM unit, and another bit in the SSR1 is set to indicate the thread is non-transactional. The thread is set to return to the transaction's software failure handler, which address is in another save/restore register, SSR0. The transaction exception and summary register (TEXASR) is set to indicate a persistent failure, and a condition register is set to indicate a transaction failure to the transaction's software failure handler.

At 450, the thread is resumed to the failure handler in non-transactional state.

At 455, the thread attempts to execute a TM instruction.

In response, at 460 a TM Unavailable Interrupt is sent to the OS 215. On a TBEGIN or TEND instruction, the thread is resumed at the software failure handler with a persistent failure cause and the condition register (CR0) set to indicate failure.

Figure 5:
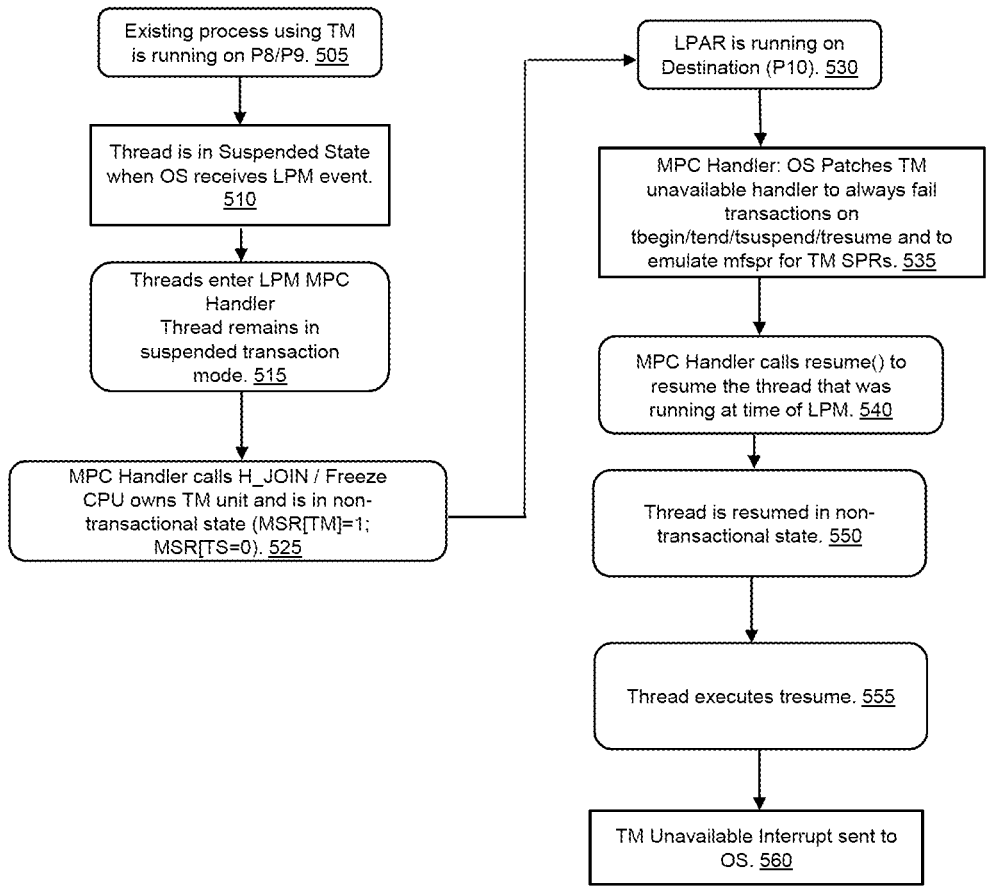
FIG. 5 illustrates another process flow for TM disablement on live partition mobility (LPM) from a previous generation of computer server hardware (P8/9) to that of a subsequent generation (P10), in accordance with one or more aspects of the present invention.

FIG. 5 illustrates another process flow for TM disablement on live partition mobility (LPM) from a previous generation of computer server hardware (P8/9) to that of a subsequent generation (P10), in accordance with one or more aspects of the present invention.

In this example, the threads are in suspended state at the time the LPM is initiated from the P8/9 and the P10.

At 505, the thread is executing on the P8/9 server where TM is enabled.

At 510, the thread is in the suspended state at the time the OS 215 receives the command to enter the LPM event.

At 515, the thread enters the LPM MPC handler, and the thread remains in suspended transaction mode. The MPC handler reclaims the transaction into live registers and saves off the checkpoint state to the machine state area (MST). When a transaction is initiated or is failed, a set of registers are saved or restored which represent the pre-transaction state of the processor. The registers include the problem state writable registers, except for certain performance monitor, the TM SPRs, and condition registers. Now, the thread is in non-transactional mode, and the thread no longer has TM access. Note, this is done on every LPM from a P8/P9 system regardless of whether the destination is a P10.

At 525, MPC handler freezes LPAR operations while the LPM migration is taking place.

At 530, the LPM completes, and the LPAR is running on the destination P10.

At 535, the MPC handler takes the following actions. The OS 215 patches the TM unavailable handler to always fail transactions on TM instructions (i.e., TBEGIN, TEND, TSUSPEND, and TRESUME) and to emulate the move from special registers (using for example the mfspr instruction) for the TM special purpose registers. These registers hold information related to the state of a TM transaction.

At 540, the MPC handler resumes (resume( )) the thread that was running at the time of the LPM. The resume( ) call restores the running state of the thread. The register state of the GPRs and SPRs is restored from the MST (the suspended transaction state). The thread's kernel stack contains the pre-transactional state. The thread's TM state is set to restrict access to the TM unit in the machine status save/restore register. For example, upon return to thread context, a bit in the SSR1 is set to restrict access to the TM unit, and another bit in the SSR1 is set to indicate the thread is non-transactional. The thread is set to return to the instruction address register (IAR), resuming the thread at the next instruction.

The TM SPRs, including the TEXASR, is restored from the thread's extended TM context save area.

At 550, the thread is resumed in non-transactional state.

At 555, the thread executes the TRESUME instruction to resume thread execution.

In response, at 560 a TM Unavailable Interrupt is sent to the OS 215. The TM Unavailable Handler restores the pre-transactional checkpoint state into the GPRs and SPRs. The thread is set to return to the transaction's software failure handler. The TEXASR register, indicating TM exception/status, is set to indicate a persistent failure. The condition register (CR0) is set to indicate transaction failure to the transaction's software failure handler. The thread is resumed at the transaction's software failure handler via an instruction (e.g., RFID) at the end of an exception handler that also provides context synchronization.

Figure 6:
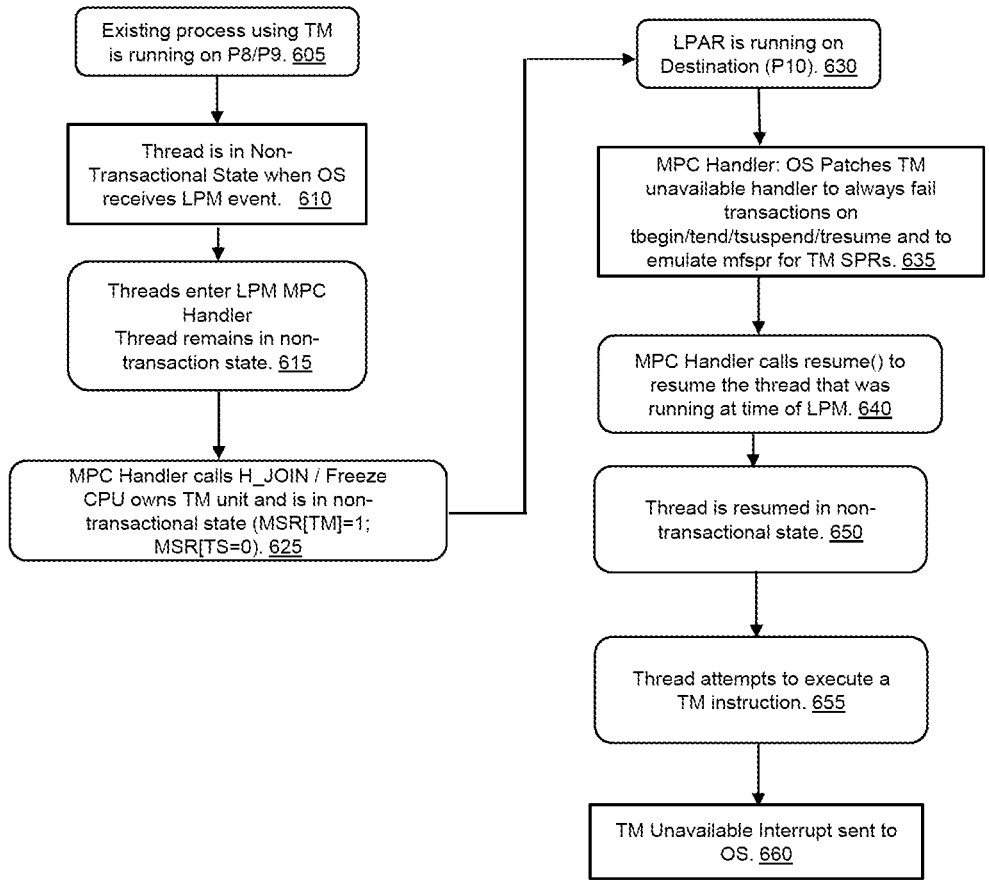
FIG. 6 illustrates another process flow for TM disablement on live partition mobility (LPM) from a previous generation of computer server hardware (P8/9) to that of a subsequent generation (P10), in accordance with one or more aspects of the present invention.

FIG. 6 illustrates another process flow for TM disablement on live partition mobility (LPM) from a previous generation of computer server hardware (P8/9) to that of a subsequent generation (P10), in accordance with one or more aspects of the present invention.

In this example, the threads used TM in the past and were in non-transactional state at the time of the LPM from the P8/9 to the P10.

At 605, the thread is executing on the P8/9 server where TM is enabled.

At 610, the thread is in the non-transactional state at the time the OS 215 receives the command to enter the LPM event.

At 615, the thread enters the LPM MPC handler, and the thread remains in the non-transactional state. The MPC handler saves the thread state to the machine state area (MST) and removes TM access for the thread. Note, this is done on every LPM from a P8/P9 system regardless of whether the destination is a P10.

At 625, MPC handler freezes LPAR operations while the LPM migration is taking place.

At 630, the LPM completes, and the LPAR is running on the destination P10.

At 635, the MPC handler takes the following actions. The OS 215 patches the TM unavailable handler to always fail transactions on TM instructions (i.e., TBEGIN, TEND, TSUSPEND, and TRESUME) and to emulate the move from special registers (using for example the mfspr instruction) for the TM special purpose registers. These registers hold information related to the state of a TM transaction.

At 640, the MPC handler resumes (resume( )) the thread that was running at the time of the LPM. The resume( ) call restores the register state of the GPRs and SPRs. The thread's TM state is set to restrict access to the TM unit in the machine status save/restore register. For example, upon return to thread context, a bit in the SSR1 is set to restrict access to the TM unit, and another bit in the SSR1 is set to indicate the thread is non-transactional. The thread is set to return to the instruction address register (IAR), resuming the thread at the next instruction.

At 650, the thread is resumed in non-transactional state.

At 655, the thread attempts to execute a TM instruction.

In response, at 660 a TM Unavailable Interrupt is sent to the OS 215. For TBEGIN, the TM Unavailable Handler sets the thread to return to the transaction's software failure handler. The TEXASR register, indicating TM exception/status, is set to indicate a persistent failure. The condition register (CR0) is set to indicate transaction failure to the transaction's software failure handler. The thread is resumed at the transaction's software failure handler via an instruction (e.g., RFID) at the end of an exception handler that also provides context synchronization.

Figure 7:
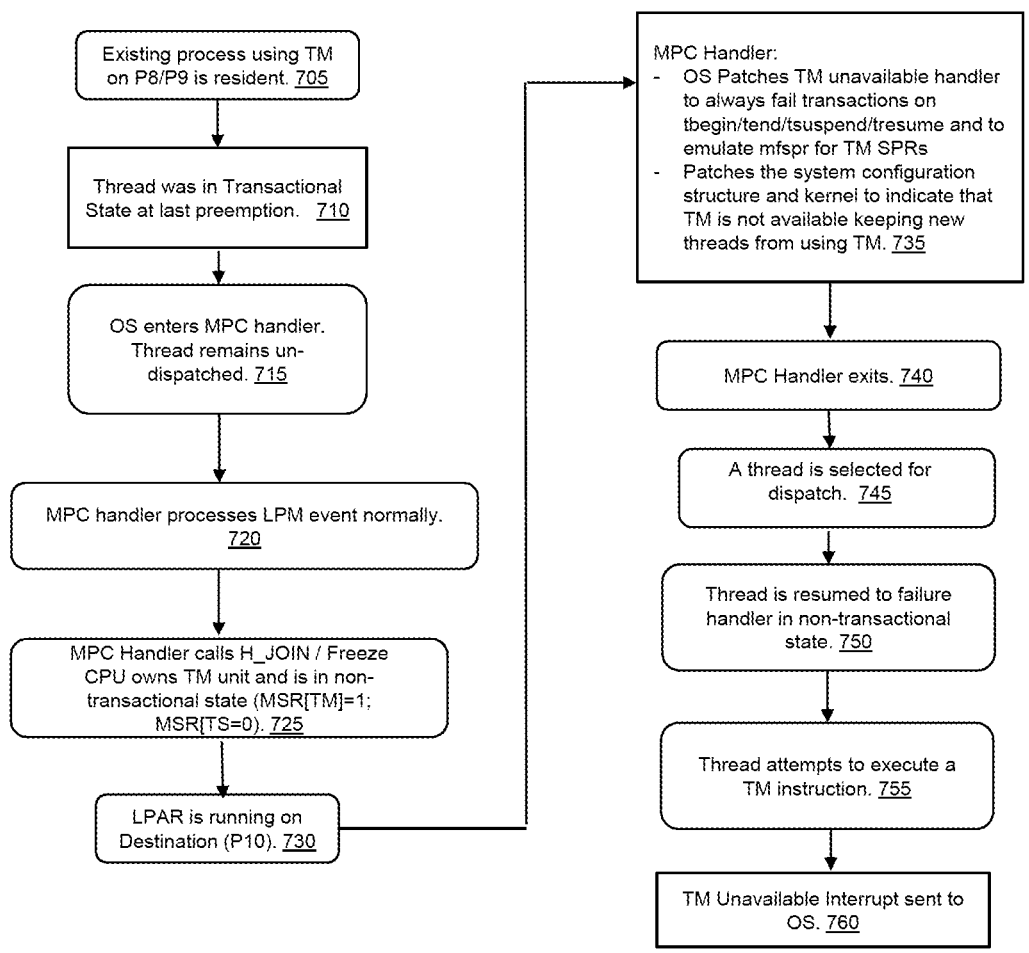
FIG. 7 illustrates another process flow for TM disablement on live partition mobility (LPM) from a previous generation of computer server hardware (P8/9) to that of a subsequent generation (P10), in accordance with one or more aspects of the present invention.

FIG. 7 illustrates another process flow for TM disablement on live partition mobility (LPM) from a previous generation of computer server hardware (P8/9) to that of a subsequent generation (P10), in accordance with one or more aspects of the present invention.

In this example, the threads are undispatched, but were in transactional state at the time of pre-emption, i.e., when they were interrupted while executing due to an expired time slice, for example.

At 705, the thread is executing on the P8/9 server where TM is enabled.

At 710, the thread is in the transactional state at the time of its last pre-emption.

At 715, the thread enters the LPM MPC handler, and the thread remains in the transactional, but undispatched, state.

At 720, the MPC handler processes the LPM event normally. Generally, this includes preparing the source and destination environments for executing the LPM event. A mapping of virtual adapters is created on the source and destination LPARs. The logical partition state of the source environment is transferred to the destination environment, including the partition profiles that will be migrated to the destination server. The LPAR on the source server is suspended until the LPM event completes, at which time the LPAR is resumed on the destination server.

At 725, MPC handler freezes LPAR operations while the LPM migration is taking place.

At 730, the LPM completes, and the LPAR is running on the destination P10.

At 735, the MPC handler takes the following actions. The OS 215 patches the TM unavailable handler to always fail transactions on TM instructions (i.e., TBEGIN, TEND, mfspr instruction) for the TM special purpose registers. These registers hold information related to the state of a TM transaction. The system configuration structure and the kernel are patched to indicate that TM is not available, thereby preventing new threads from using TM.

At 740, the MPC handler exits.

At 745, a thread is chosen for dispatch, as follows. The thread's TM state is set to restrict access to the TM unit in the machine status save/restore register. For example, upon return to thread context, a bit in the SSR1 is set to restrict access to the TM unit, and another bit in the SSR1 is set to indicate the thread is non-transactional. The thread is set to return to the thread's software failure handler. The OS 215 copies the TEXASR indicating a persistent failure.

At 750, the thread is resumed to the software failure handler in non-transactional state.

At 755, the thread attempts to execute a TM instruction.

At 760, in response, a TM Unavailable Interrupt is sent to the OS 215. For TBEGIN, the software failure handler restores the pre-transactional checkpoint state into the GPRs and SPRs. The thread is set to return to the transaction's software failure handler. The TEXASR register is set to indicate a persistent failure. CR0 is set to indicate transaction failure to the transaction's software failure handler, and the thread is resumed at the transaction's software failure handler via an instruction (e.g., RFID) at the end of an exception handler that also provides context synchronization.

Figure 8:
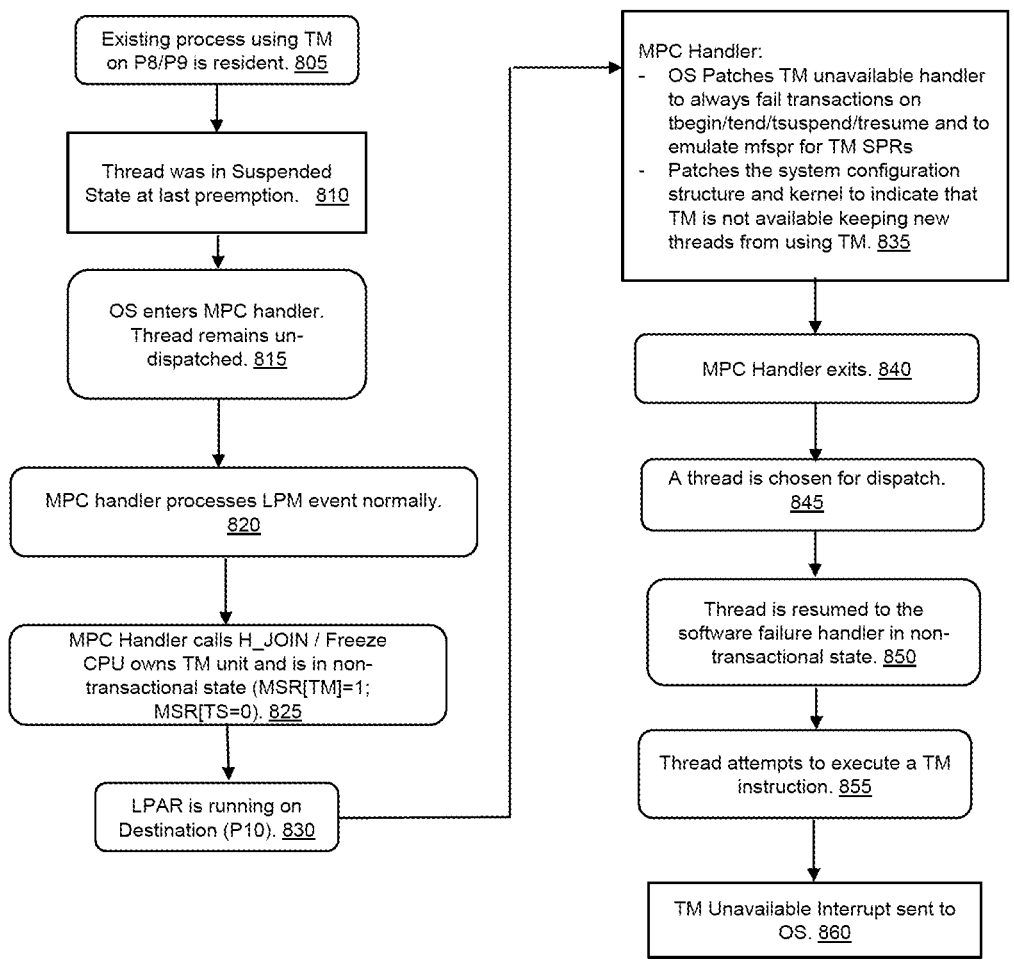
FIG. 8 illustrates another process flow for TM disablement on live partition mobility (LPM) from a previous generation of computer server hardware (P8/9) to that of a subsequent generation (P10), in accordance with one or more aspects of the present invention.

FIG. 8 illustrates another process flow for TM disablement on live partition mobility (LPM) from a previous generation of computer server hardware (P8/9) to that of a subsequent generation (P10), in accordance with one or more aspects of the present invention.

In this example, the threads are undispatched, but were in the suspended state at the time of pre-emption, i.e., when they were interrupted while executing due to an expired time slice, for example.

At 805, the thread is executing on the P8/9 server where TM is enabled.

At 810, the thread is in the suspended state at the time of its last pre-emption.

At 815, the thread enters the LPM MPC handler, and the thread remains in the undispatched state.

At 820, the MPC handler processes the LPM event normally. Generally, this includes preparing the source and destination environments for executing the LPM event. A mapping of virtual adapters is created on the source and destination LPARs. The logical partition state of the source environment is transferred to the destination environment, including the partition profiles that will be migrated to the destination server. The LPAR on the source server is suspended until the LPM event completes, at which time the LPAR is resumed on the destination server.

At 825, MPC handler freezes LPAR operations while the LPM migration is taking place.

At 830, the LPM completes, and the LPAR is running on the destination P10.

At 835, the MPC handler takes the following actions. The OS 215 patches the TM unavailable handler to always fail transactions on TM instructions (i.e., TBEGIN, TEND, mfspr instruction) for the TM SPRs. These registers hold information related to the state of a TM transaction. The system configuration structure and the kernel are patched to indicate that TM is not available, thereby preventing new threads from using TM.

At 840, the MPC handler exits.

At 845, a thread is chosen for dispatch, as follows. The thread's register state (GPRs and SPRs) is restored from the MST. The thread's kernel stack contains the pre-transactional state. The thread's TM state is set to restrict access to the TM unit in the machine status save/restore register. For example, upon return to thread context, a bit in the SSR1 is set to restrict access to the TM unit, and another bit in the SSR1 is set to indicate the thread is non-transactional. The thread is set to return to the instruction address register (IAR), resuming the thread at the next instruction. The TEXASR register (indicating TM exception/status) is set to indicate a persistent failure.

At 850, the thread is resumed to the software failure handler in the non-transactional state.

At 855, the thread attempts to execute a TM instruction.

At 860, a TM Unavailable Interrupt is sent to the OS 215. The TM unavailable handler takes the following actions. The pre-transactional checkpoint state is restored into the GPRs and SPRs. The thread is set to return to the transaction's software failure handler. The TEXASR register (indicating TM exception/status) is set to indicate a persistent failure. The condition register CR0 is set to indicate transaction failure to the transaction's software failure handler. The thread is resumed at the transaction's software failure handler via an instruction (e.g., RFID) at the end of an exception handler that also provides context synchronization.

Figure 9:
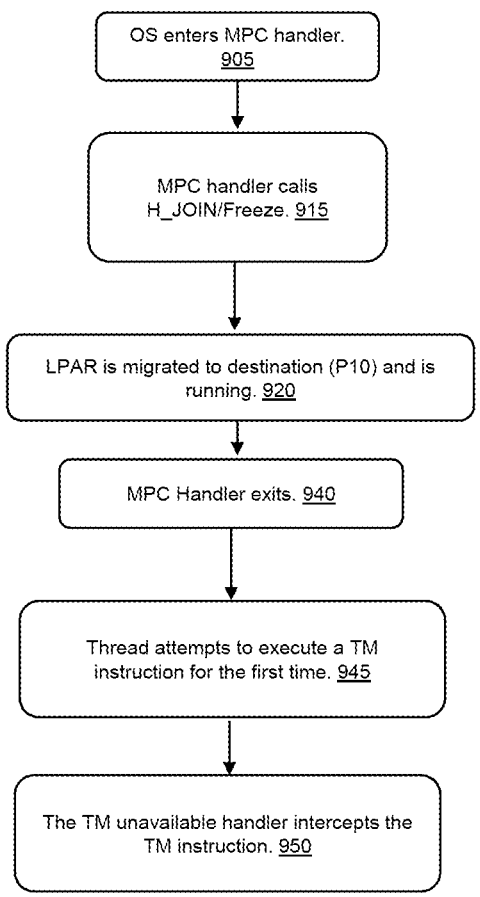
FIG. 9 illustrates another process flow for TM disablement on live partition mobility (LPM) from a previous generation of computer server hardware (P8/9) to that of a subsequent generation (P10), in accordance with one or more aspects of the present invention.

FIG. 9 illustrates another process flow for TM disablement on live partition mobility (LPM) from a previous generation of computer server hardware (P8/9) to that of a subsequent generation (P10), in accordance with one or more aspects of the present invention.

This example describes the processing of new threads that attempt to use TM for the first time after LPM.

At 905, the OS 215 enters the MPC handler, which processes the LPM event normally. The LPM MPC handler is part of the guest operating system that is running in the VM/LPAR (container) that is being migrated. For example, for the AIX operating system, the MPC handler is part of the kernel. Generally, this includes preparing the source and destination environments for executing the LPM event. A mapping of virtual adapters is created on the source and destination LPARs. The logical partition state of the source environment is transferred to the destination environment, including the partition profiles that will be migrated to the destination server. The LPAR on the source server is suspended until the LPM event completes, at which time the LPAR is resumed on the destination server.

At 915, the MPC handler freezes LPAR operations while the LPM migration is taking place.

At 920, the LPAR is migrated to the destination (P10) and is running.

At 935, the MPC handler takes the following actions. The OS 215 patches the TM unavailable handler to always fail transactions on TM instructions (i.e., TBEGIN, TEND, mfspr instruction) for the TM SPRs. These registers hold information related to the state of a TM transaction. The system configuration structure and the kernel are patched to indicate that TM is not available, thereby preventing new threads from using TM, following which the MPC handler exists (940).

At 945, the thread attempts to execute a TM instruction for the first time.

At 950, in response to the attempted execution of the TM instruction, the TM unavailable handler sets the thread to return to the transaction's software failure handler. The TEXASR register (indicating TM exception/status) is set to indicate a persistent failure. The condition register CR0 is set to indicate transaction failure to the transaction's software failure handler. The thread is resumed at the transaction's software failure handler via an instruction (e.g., RFID) at the end of an exception handler that also provides context synchronization.

FIG. 10 illustrates a process flow for TM re-enablement on LPM from a subsequent generation of computer server hardware (P10) to that of a previous generation (P8/9), in accordance with one or more aspects of the present invention.

In this example, threads were in suspended state at the time of the original LPM from P8/9 to P10.

At 1005, the hypervisor makes TM available to the partition on the destination P8/9 system.

At 1010, LPM migrates the LPAR to the destination P8/9 which processes the LPM event normally, as described previously.

At 1020, the MPC Handler causes the OS 215 to patch the TM unavailable handler to always fail transactions that attempt to execute a TM instruction, and to emulate the move from special registers (using for example the mfspr instruction) for the TM special purpose registers. The MPC Handler patches the system configuration structure and kernel to indicate that TM is not available, thereby keeping new threads from using TM, after which the MPC Handler exits (1040).

At 1045, a thread is chosen for dispatch, as follows. The register state (GPRs and SPRs) are restored from the MST (suspended transaction state). The thread's kernel stack contains the pre-transactional state. The thread's TM state is set to restrict access to the TM unit in the machine statue save/restore register, and to be in a non-transactional state upon return to the thread context. The thread is set to return to the instruction address register (IAR), resuming the thread at the next instruction. The TEXASR register (indicating TM exception/status) is set to indicate a persistent failure.

At 1050, the thread attempt to execute a TM instruction.

At 1055, a TM Unavailable Interrupt is sent to the OS 215. The TM unavailable handler does the following. The pre-transactional checkpoint state is restored into the GPRs and SPRs. The thread is set to return to the transaction's software failure handler. The TEXASR register is set to indicate a transient failure, and the thread is resumed at the transaction's software failure handler via an instruction (e.g., RFID) at the end of an exception handler that also provides context synchronization.

At 1070, the thread can choose to re-attempt the transaction on the P8/9 system, if the persistent failure cause bit is not set in the TEXASR. For example, the application can be designed to always fail over to the alternative locking mechanism, or to retry using TM.

FIG. 11 illustrates another process flow for TM re-enablement on LPM from a subsequent generation of computer server hardware (P10) to that of a previous generation (P8/9), in accordance with one or more aspects of the present invention.

In this example, threads are in non-transactional state at time of original LPM from P8/P9 to P10.

At 1105, the existing thread is running on the P10, where the thread is in a suspended state.

At 1110, the thread enters the LPM MPC handler. The MPC handler saves the thread state as normal on the P10, which is still the source system (1120).

At 1130, MPC handler freezes LPAR operations while the LPM migration is taking place. Access to the TM unit is enabled and the CPU is in non-transactional state.

At 1140, the thread is now running on the P8/9 server.

At 1145, the MPC handler causes the OS 215 to patch the TM unavailable handler to enable Transactional Memory and patches the kernel to report that TM is available to applications.

At 1150, the MPC handler then resumes the thread (resume( )) that was running at the time of the LPM event. This includes restoring the register state (GPRs and SPRs). The thread's TM state is set to restrict access to the TM unit and to be non-transactional upon return to the thread context. The thread is set to return to the next instruction.

At 1160, the thread is resumed in the non-transactional state.

At 1165, the thread attempts to execute a TM instruction that causes the thread to enter the TM state.

At 1170, the TM Unavailable Interrupt is sent to the OS 215.

At 1175, the thread is resumed at the software failure handler without a persistent failure cause and the condition register CR0 set to indicate success.

At 1180, the thread continues to use TM.

What is claimed is:

1. A method comprising:
    performing a first migration of a first running logical partition (LPAR) from a first-generation computer to a second-generation computer, where an availability of a facility differs between the first-generation computer and the second-generation computer, and wherein an operating system of the first running LPAR is actively executing the facility during the first migration;
    upon completion of the first migration, the operating system of the first running LPAR detecting whether a required facility in use on the first-generation computer is available on the second-generation computer; and based on the required facility being available on the second-generation computer, the operating system continuing execution of the first running LPAR;

based on the required facility not being available on the second-generation computer, the operating system continuing execution of the required facility in emulation mode until work requiring the required facility completes, after which the operating system intercepts attempts to execute the required facility, signals an illegal operation to a calling process; and terminating the calling process in response to the calling process not executing a signal handler.

2. The method of claim 1, comprising: performing a second migration of a first running LPAR from the second-generation computer back to the first-generation computer, wherein the required facility is available on the first-generation computer, and wherein the operating system restores access to threads of an application to the required facility.

3. The method of claim 1, wherein the required facility includes a processor facility having an availability control, wherein software is required to provide a fail-over path when instructions associated with executing the processor facility report a failure.

4. The method of claim 1, wherein following a completed migration, the operating system issues an unavailable interrupt to threads that are executing transactional memory instructions but are not in a transaction when the migrating occurs, and wherein the operating system resumes the threads at a software failure handler.

5. The method of claim 1, wherein following a completed migration, for threads of an application that are in a transaction and are suspended by the operating system, the operating system emulates transaction mode to allow the completion of the transaction's suspended section, and wherein following the completion of the transaction's suspended section, the operating system issues a persistent failure to the threads.

6. The method of claim 1, wherein following a completed migration, the operating system issues an unavailable interrupt to threads that attempt to begin a transaction, and wherein the operating system terminates the threads.

7. The method of claim 1 wherein upon migrating the first running LPAR from the second-generation computer where the required facility is not available to the first-generation computer having the required facility, the operating system dynamically enables the required facility to threads of an application.

8. A computer program product, the computer program product comprising a non-transitory tangible storage device having program code embodied therewith, the program code executable by a processor of a computer to perform a method, the method comprising:

performing a first migration of a first running logical partition (LPAR) from a first-generation computer to a second-generation computer, where an availability of a facility differs between the first-generation computer and the second-generation computer, and wherein an operating system of the first running LPAR is actively executing the facility during the first migration;

upon completion of the first migration, the operating system of the first running LPAR detecting whether a required facility in use on the first-generation computer is available on the second-generation computer; and based on the required facility being available on the second-generation computer, the operating system continuing execution of the first running LPAR;

based on the required facility not being available on the second-generation computer, the operating system continuing execution of the required facility in emulation mode until work requiring the required facility completes, after which the operating system intercepts attempts to execute the required facility, signals an illegal operation to a calling process; and terminating the calling process in response to the calling process not executing a signal handler.

9. The computer program product of claim 8, comprising: performing a second migration of a first running LPAR from the second-generation computer back to the first-generation computer, wherein the required facility is available on the first-generation computer, and wherein the operating system restores access to threads of an application to the required facility.

10. The computer program product of claim 8, wherein the required facility includes a processor facility having an availability control, wherein software is required to provide a fail-over path when instructions associated with executing the processor facility report a failure.

11. The computer program product of claim 8, wherein following a completed migration, the operating system issues an unavailable interrupt to threads that are executing transactional memory instructions but are not in a transaction when the migrating occurs, and wherein the operating system resumes the threads at a software failure handler.

12. The computer program product of claim 8, wherein following a completed migration, for threads that are in a transaction and are suspended by the operating system, the operating system emulates transaction mode to allow the completion of the transaction's suspended section, and wherein following the completion of the transaction's suspended section, the operating system issues a persistent failure to the threads.

13. The computer program product of claim 8, wherein following a completed migration, the operating system issues an unavailable interrupt to threads that attempt to begin a transaction, and wherein the operating system terminates the threads.

14. The computer program product of claim 8 wherein upon migrating the first running LPAR from the second-generation computer where the required facility is not available to the first-generation computer having the required facility, the operating system dynamically enables the required facility to threads.

15. A computer system, comprising:

one or more processors;

a memory coupled to at least one of the processors;

a set of computer program instructions stored in the memory and executed by at least one of the processors in order to perform actions of:

performing a first migration of a first running logical partition (LPAR) from a first-generation computer to a second-generation computer, where an availability of a facility differs between the first-generation computer and the second-generation computer, and wherein an operating system of the first running LPAR is actively executing the facility during the first migration;

upon completion of the first migration, the operating system of the first running LPAR detecting whether a required facility in use on the first-generation computer is available on the second-generation computer; and based on the required facility being available on the second-generation computer, the operating system continuing execution of the first running LPAR;

based on the required facility not being available on the second-generation computer, the operating system continuing execution of the required facility in emulation mode until work requiring the required facility completes, after which the operating system intercepts attempts to execute the required facility, signals an illegal operation to a calling process; and terminating the calling process in response to the calling process not executing a signal handler.

16. The computer system of claim 15, comprising:
performing a second migration of a first running LPAR from the second-generation computer back to the first-generation computer, wherein the required facility is available on the first-generation computer, and wherein the operating system restores access to threads of an application to the required facility.

17. The computer system of claim 15, wherein the required facility includes a processor facility having an availability control, wherein software is required to provide a fail-over path when instructions associated with executing the processor facility report a failure.

18. The computer system of claim 15, wherein following a completed migration, the operating system issues an unavailable interrupt to threads that are executing transactional memory instructions but are not in a transaction when the migrating occurs, and wherein the operating system resumes the threads at a software failure handler.

19. The computer system of claim 15, wherein following a completed migration, for threads that are in a transaction and are suspended by the operating system, the operating system emulates transaction mode to allow the completion of the transaction's suspended section, and wherein following the completion of the transaction's suspended section, the operating system issues a persistent failure to the threads.

20. The computer system of claim 15, wherein following a completed migration, the operating system issues an unavailable interrupt to threads that attempt to begin a transaction, and wherein the operating system terminates the threads.

* * * * *